United States Patent
Lotz et al.

(10) Patent No.: US 9,950,864 B2
(45) Date of Patent: Apr. 24, 2018

(54) CONVEYOR SYSTEM HAVING A CONVEYOR BELT

(71) Applicant: ContiTech Transportbandsysteme GmbH, Hannover (DE)

(72) Inventors: Florian Lotz, Brevörde (DE); Jens Löschner, Bovenden (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/320,029

(22) PCT Filed: Apr. 1, 2015

(86) PCT No.: PCT/EP2015/057157
§ 371 (c)(1),
(2) Date: Dec. 19, 2016

(87) PCT Pub. No.: WO2015/197208
PCT Pub. Date: Dec. 30, 2015

(65) Prior Publication Data
US 2017/0152108 A1   Jun. 1, 2017

(30) Foreign Application Priority Data
Jun. 24, 2014   (DE) .................. 10 2014 212 046

(51) Int. Cl.
*B65G 15/00*   (2006.01)
*B65G 15/30*   (2006.01)
*B65G 15/38*   (2006.01)

(52) U.S. Cl.
CPC .................. *B65G 15/38* (2013.01)

(58) Field of Classification Search
None
See application file for complete search history.

(56) References Cited

U.S. PATENT DOCUMENTS 5,119,927 A * 6/1992 Bruggemann ......... B65G 15/34
                                                           198/846
5,340,867 A * 8/1994 Yagawa ................... C08K 3/02
                                                           523/205

(Continued)

FOREIGN PATENT DOCUMENTS

CN   102642693 A   8/2012
CN   103524914 A   1/2014
(Continued)

*Primary Examiner* — Kavel Singh
(74) *Attorney, Agent, or Firm* — David L. Cate

(57) ABSTRACT

The invention relates to a conveyor system, comprising a conveyor belt, which has a carrying-side cover plate (3) and a running-side cover plate (4), and comprising drums, supporting rollers, and supporting frames, wherein the conveyor system forms a material-conveying upper run having a feed point for the conveying material and a mostly material-free lower run. For a further sufficient flame-inhibiting effect that does not negatively affect the further physical properties of the conveyor belt and that does not pose a health hazard to persons, animals, or the environment, the carrying-side (carrying side) cover plate (3) and/or the running-side (running side) cover plate (4) contains at least one flameproofing agent, wherein the flameproofing agent is free of bromium and bromium compounds.

2 Claims, 1 Drawing Sheet

(56) References Cited

U.S. PATENT DOCUMENTS

| | | | | |
|---|---|---|---|---|
| 8,701,873 B2 * | 4/2014 | Kuesel | .................. | B65G 43/02 |
| | | | | 198/502.1 |
| 9,487,636 B2 * | 11/2016 | Rocktaschel | ........ | C08K 3/0058 |
| 2008/0269385 A1 | 10/2008 | Alexander et al. | | |

FOREIGN PATENT DOCUMENTS

| DE | 102011051592 A1 | 1/2013 |
|---|---|---|
| DE | 102012103965 A | 11/2013 |
| DE | 102012111599 A | 6/2014 |
| JP | 2012092182 A | 5/2012 |

\* cited by examiner

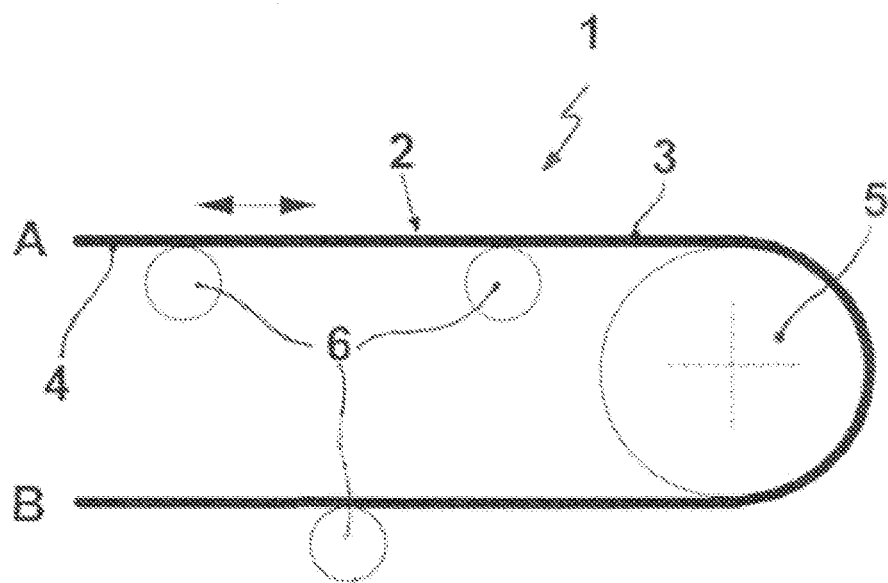

CONVEYOR SYSTEM HAVING A CONVEYOR BELT

The invention relates to a conveyor system with a conveyor belt comprising an outer sheet on the loadbearing side and an outer sheet on the drive side, at least one other, i.e. additional, layer composed of at least one polymeric material between outer sheet on the loadbearing side and outer sheet on the drive side, and moreover with drums, loadbearing rollers, and supportive structures, where the conveyor system forms a material-conveying upper web with an application site for the material to be conveyed, and forms a mostly material-free lower web. However, there are also conveyor systems that are additionally loaded within the lower web.

A conveyor system of this general type is described in detail in particular in DE 36 06 129 A, EP 1 187 781 B1, DE 36 12 765 A1, EP 1 222 126 B1, DE 43 33 839 B4, WO 2005/023688 A1, EP 0 336 385 B1, WO 2008/034483 A1, EP 1 053 447 B1, and U.S. Pat. No. 7,178,663 B2.

The outer sheet on the loadbearing side and the outer sheet on the drive side of a conveyor belt, as core component of a conveyor system, are in most cases composed of a foil or of a woven fabric, or preferably of a rubber mixture comprising at least one rubber component or one rubber-component blend, at least one crosslinking agent or one crosslinking system, comprising a crosslinking agent and an accelerator, and also in most cases other mixture ingredients, in particular at least one filler and/or at least one processing aid and/or at least one aging retarder and/or at least one plasticizer and/or other additional substances (e.g. fibers, color pigments).

Vulcanization of the rubber mixture provides the required resilient properties to the conveyor belt.

Flame retardants are generally also added to the two outer sheets in order to satisfy the requirements in respect of flame retardancy and fire protection. Brominated compounds have hitherto been used here, not only for steel-cord conveyor belts but also for woven-fabric conveyor belts. These ensure that the conveyor system can be used in a very wide variety of climatic regions. In particular, steel-cord conveyor belts used in countries where temperatures are sometimes very low use rubbers with low-temperature flexibility, for example butadiene rubber or styrene-butadiene rubber, where these have been rendered flame retardant by use of brominated compounds. Brominated compounds provide good flame retardancy even when the quantities used are small, but they are what are known as PBT (persistent, bioaccumulative, toxic) materials, and in accordance with the most recent requirements, their use therefore being no longer permissible.

There are also other known flame retardants that can be used as alternatives, an example being $Al(OH)_3$ or trioctyl phosphate (TOF) or chloroparaffin, but higher concentrations of these then have to be used, and they in particular have an adverse effect on other properties such as tensile strength, elongation, tear strength, abrasion, etc.

Another very well-known flame retardant is antimony trioxide. It often acts as synergist in combination with halogen-containing flame retardants. The mechanism of action of halogen-containing flame retardants is based on interruption of free-radical-chain mechanisms during the combustion process in the gas phase. Antimony trioxide as synergist, on exposure to heat, facilitates decomposition of halogenated compounds via formation of halogenated antimony compounds which in turn react with the free OH and H radicals in the flame. Halogenated, in particular brominated, flame retardants have the disadvantage that combustion produces polyhalogenated compounds. These are toxic, have poor biodegradability, and accumulate in the food chain. Antimony trioxide is classified as a substance that may be carcinogenic in humans, and particular safety measures therefore have to be implemented for procedures (e.g. weighing-out) using antimony trioxide. Combustion in conventional systems produces volatile antimony chlorides which can cause burning of the skin and damage to the eyes. Antimony occupies 61st place in the frequency of occurrence of elements in the outer regions of the Earth and its atmosphere, and is susceptible to raw-material price fluctuations and raw-material shortages.

In particular in the construction industry and cable industry, it is already known that other alternative flame-retardant substances can be used, for example for PE cables and/or PVC cables, or for production of fire-prevention coatings and fire-prevention seals on buildings, see inter alia GB 2 230 255 A, DE 690 27 214 T2, or DE 41 42 903 A1. DE 696 03 731 T2 discloses that inorganic fillers for PVC- or PE containing polymer mixtures can be coated with flame retardants. These are single-layer systems in which adhesion between individual layers is of no significance. Possible problems of adhesion between layers has therefore made it difficult to select suitable alternative flame retardants for multilayer systems.

The object of the invention consists in providing, in the context of a further development, a conveyor system with conveyor belt featuring adequate flame-retardant effect without any adverse effect on other physical properties of the conveyor belt, and without any health hazard to humans, animals, or the environment.

Said object is achieved in that the outer sheet on the loadbearing side and/or the outer sheet on the drive side comprises at least one flame retardant, where the flame retardant is free from bromine and bromine compounds.

Surprisingly, it has been found that the use of bromine-free flame retardants at least in the drive side and/or in the loadbearing side of the conveyor belt provides identical or improved physical properties of the drive side and/or of the loadbearing side, while at the same time flame retardancy properties were identical or improved.

Flame retardants of this type can therefore be used as full alternatives to the flame retardants commonly used, or at least permit significant reduction of the quantity of the abovementioned brominated flame retardants with their somewhat disadvantageous effect on health. The flame retardants used in the invention are bromine-free, and it is therefore possible to reduce significantly, or sometimes entirely eliminate, the content of bromine and/or bromine compounds in the outer sheet on the loadbearing side and/or in the outer sheet on the drive side.

Flame retardants of the invention that can be used here are any of the bromine- and antimony-trioxide-free flame retardants known to the person skilled in the art.

Materials that can be used here are in particular stannates, such as zinc stannate or zinc hydroxystannate, hydroxides, such as magnesium hydroxide or aluminum hydroxide, cyanurates, such as melamine cyanurate, borates, such as zinc borate, phosphorus-containing components, such as resorcinol diphosphate or aromatic polyphosphates, nitrogen-containing components, such as ammonium phosphate, intumescent mixtures, carbonates, such as calcium carbonate or magnesium carbonate, or expandable graphite. Intumescent mixtures expand to give foams. They are used to provide protection from the effects of heat and fire to combustible materials such as plastics or wood, and also steel, which suffers a loss of strength at elevated temperature.

Materials which have particularly good suitability are stannate, in particular zinc hydroxystannate (ZHS). ZHS is particularly nonhazardous to humans, and there is therefore no requirement for any particular safety measures. At the same time, in comparison with antimony trioxide it is now significantly easier to purchase, and at lower cost, and is less susceptible to raw-material price fluctuations and raw-material shortages. When ZHS is used, furthermore, no impairment of physical properties is found, and improved flame retardancy properties are found.

The bromine-free flame retardants mentioned can be used here alone or in combination. The total quantity of bromine-free flame retardant in the drive side and/or in the loadbearing side is respectively preferably from 1 to 100 phr, particularly preferably from 10 to 30 phr.

It has been found to be advantageous for the drive side and/or the loadbearing side respectively also to comprise at least one other flame retardant. This is preferably a flame retardant which comprises antimony and/or which is an antimony compound. In combination with the abovementioned flame retardants it is possible here to achieve a significant reduction of the quantity of the other, antimony-containing flame retardant and/or of the antimony compound. The quantity, in each case based on the total quantity of the drive side and/or of the loadbearing side, is preferably from 0 to 5 phr, particularly preferably from 0 to 3 phr and very particularly preferably 0 phr.

However, it is also alternatively possible that the other flame retardant is chloroparaffin, quantities thereof being preferably from 0 to 25 phr, particularly preferably from 0 to 15 phr. In order not only to provide freedom from bromine and bromine compounds in the drive side and/or in the loadbearing side but also to ensure complete freedom from halogens and halogen compounds, it is very particularly preferable that the quantity of chloroparaffin and/or of other halogens and halogen compounds is 0 phr.

The invention is in principle suitable for all conveyor systems and conveyor belts. Mention may be made here in particular of steel-cord conveyor belts and textile conveyor belts. Other advantages of the invention are apparent in particular for high-temperature conveyor belts, which can take the form of steel-cord conveyor belts or textile conveyor belts and are required to transport products which have high temperatures (mostly >250° C.). Requirements in respect of flame retardancy and fire protection are particularly stringent here.

For the reasons mentioned in the introduction, advantages are likewise apparent here in the case of conveyor belts which are used in climatic regions with very low temperatures and which mostly comprise rubbers with low-temperature flexibility.

The outer sheet on the loadbearing side and/or the outer sheet on the drive side can take the form of foil or woven fabric, respectively rendered flame-retardant in the invention. It is preferable that the outer sheet on the loadbearing side and the outer sheet on the drive side are respectively composed of at least one polymeric material. It is preferable that the polymeric material is a rubber selected from the group consisting of natural rubber (NR) and/or butadiene rubber (BR) and/or chloroprene rubber (CR) and/or sytrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM). The rubbers mentioned can be used here alone or in a blend.

Particular significance is especially attached to CR, which features high flame resistance, high weathering resistance, and high aging resistance, in particular for conveyor belts used in underground mining. Use of CR provides an additional weight saving in particular for filter belts. Other materials that have achieved relatively high significance in underground mining are NR and the abovementioned blends (DE 10 2009 043 904 A1).

If the outer sheet on the loadbearing side and/or the outer sheet on the drive side is a foil or a woven fabric, the materials mentioned can likewise be used here. It is particularly preferable for the composition of the foil to be based on at least one fluoropolymer. This ensures additional optimized solvent-resistance.

The two outer sheets can moreover comprise, alongside the rubber component, at least one crosslinking agent or one crosslinking system, comprising a crosslinking agent and an accelerator, and also mostly other mixture ingredients, in particular at least one filler and/or at least one processing aid and/or at least one aging retarder and/or at least one plasticizer and/or other additional substances (e.g. fibers, color pigments).

The conveyor belt also mostly has an embedded tension-member system. Steel cords running parallel in the longitudinal direction of the conveyor belt are used as tension-member system. However, the tension-member system can also be a single- or multilayer textile structure, in particular in the form of a woven fabric, preferably composed of cotton and/or polyamide and/or polyester and/or aramid and/or glass and/or basalt and/or steel. The materials mentioned can be used alone or in the form of hybrid tension-member systems composed of at least one of the materials mentioned. Particular significance is attached here to a woven polyamide-polyester fabric. In order to prevent slitting, in particular in conjunction with steel-cord conveyor belts, these also use, in the outer sheet on the loadbearing side and/or the outer sheet on the drive side, a transverse reinforcement system made of synthetic cords, for example made of polyamide, see by way of example also WO 2008/034483 A1.

The following components can also have been embedded into the outer sheet on the loadbearing side and/or the outer sheet on the drive side: Conductor loops, transponders, barcodes, a polymer matrix with detectable particles mixed therein, or other detectable elements.

The conveyor belt can also have an add-on part, for example a drive part or guide part, and also edged profiles and side-wall profiles. Add-on parts of these types are composed of a polymeric material (elastomer, thermoplastic elastomer, thermoplastic), and the bases of said parts are adhesive-bonded and/or vulcanized to the loadbearing surface of the resilient conveyor belt.

Other components of a conveyor system can be:
deflector rollers or deflector drums
hold-down rollers in tubular conveyor belt systems
correction rollers, in particular in the case of tubular conveyor belt systems
chutes at the input site for the material to be conveyed
monitoring equipment.

The invention will now be explained by using a FIGURE and by using inventive examples with reference to comparative and inventive examples and to a diagram.

Tables 1a to 1c collate the comparative examples and inventive examples. The "I" mixture here is a mixture of the invention, while the "C" mixtures are comparative mixtures. The "a" table here presents the compositions of the mixtures, while the "b" and "c" tables illustrate the corresponding physical properties associated therewith and the behavior in the event of a fire. The flame test was carried out by a method based on DIN ISO 4589, and behavior in the event of a fire was evaluated subjectively.

Quantities stated in all of the mixture examples in the table are parts by weight based on 100 parts by weight of total rubber content (phr).

The mixture was produced under conventional conditions with the aid of a laboratory roll mill. Test samples were produced by vulcanization from all of the mixtures, and these test samples were used to determine properties typical for the rubber industry. The tests described above were carried out on test samples by the following test methods:

tensile strength at room temperature in accordance with DIN 53 504

Shore A hardness at room temperature in accordance with DIN 53 505 elongation at break at room temperature in accordance with DIN 53 504 abrasion at room temperature in accordance with DIN/ISO 4649

TABLE 1a

| Constituents | Unit | C1 | C2 | I1 |
| --- | --- | --- | --- | --- |
| CR/BR | phr | 100 | 100 | 100 |
| Fillers$^a$ | phr | 10-90 | 10-90 | 10-90 |
| Plasticizers$^b$ | phr | 0-50 | 0-50 | 0-50 |
| Antimony trioxide | phr | 0-25 | 0-25 | 0-25 |
| ZHS | phr | 0 | 0 | 5-30 |
| DecaBDE$^c$ | phr | 0 | 1-20 | 0 |
| Additional substances$^d$ | phr | 5-50 | 5-50 | 5-50 |
| Vulcanization system | phr | 0.5-5 | 0.5-5 | 0.5-5 |

$^a$carbonates, oxides, hydroxides, silicates, carbon blacks,
$^b$e.g. chloroparaffins,
$^c$decabromodiphenyl ether,
$^d$stearic acid, titanium dioxide, waxes, antiozonant, etc.

TABLE 1b

| Property | Unit | C1 | C2 | I1 |
| --- | --- | --- | --- | --- |
| Hardness | Shore A | 58 | 61 | 60 |
| Abrasion | mm$^3$ | 111 | 139 | 140 |
| Tensile strength | MPa | 15 | 13 | 15 |
| Elongation at break | % | 592 | 550 | 550 |

TABLE 1c

| Property | Unit | C1 | C2 | I1 |
| --- | --- | --- | --- | --- |
| LOI (ISO 4589) | % | 33 | 37 | 38 |
| Drip behavior | | None | None | None |
| Afterflame time | sec. | 14 | 2 | 0 |
| Reignition | (after 60 sec plus hot-air blower) | no | no | no |

FIG. 1 shows a conveyor system 1 with a conveyor belt 2 comprising an outer sheet 3 on the loadbearing side for the material to be conveyed and an outer sheet 4 on the drive side made respectively of a polymeric material with resilient properties, for example of a vulcanized rubber mixture based on BR, CR or SBR, and also with an embedded tension-member system, for example in the form of steel cords. The outer sheet 4 on the drive side has contact with a drum 5, which can be the drive drum or reversal drum, and moreover has support within the upper web A and lower web B from supportive rollers 6 in the form of a supportive-roller system. The direction of the arrow shows the direction of running of the conveyor belt 2.

LIST OF REFERENCE SIGNS (Part of the Description)
1 Conveyor system
2 Conveyor belt
3 Outer sheet on loadbearing side
4 Outer sheet on drive side
5 Drum (drive drum, reversal drum)
6 Supportive rollers
A Upper web
B Lower web

What is claimed is:

1. A conveyor system comprising:
a conveyor belt comprising a first outer sheet disposed on a loadbearing side and a second outer sheet disposed on a drive side;
a plurality of drums;
a plurality of loadbearing rollers; and,
a plurality of supportive structures;
wherein the conveyor system forms a material-conveying upper web with an application site for material to be conveyed;
wherein the conveyor system forms a substantially material-free lower web;
wherein one or more of the first outer sheet on the loadbearing side, or the second outer sheet on the drive side, comprises at least a first flame retardant and a second flame retardant;
wherein the first one flame retardant is zinc hydroxystannate, zinc hydroxystannate, or a combination of zinc hydroxystannate and zinc stannate;
wherein the second flame retardant comprises antimony, an antimony compound, or a combination of antimony and an antimony compound, provided the second flame retardant is an antimony-trioxide-free flame retardant; and,
wherein the first flame retardant and the second flame retardant are free from bromine and bromine compounds.

2. The conveyor system as claimed in claim 1, wherein the second flame retardant is incorporated in an amount of from 0 to 5 phr.

* * * * *